United States Patent Office 3,284,463
Patented Nov. 8, 1966

3,284,463
2-CYCLOALKYL-HALOBENZIMIDAZOLES
Harry Goldsmith and Robert F. Crawford, La Mirada, Calif., assignors to United States Borax & Chemical Corporation, Los Angeles, Calif., a corporation of Nevada
No Drawing. Filed Jan. 22, 1964, Ser. No. 339,334
5 Claims. (Cl. 260—309.2)

This invention relates to novel cycloalkyl substituted benzimidazoles, and more particularly, to novel 2-cycloalkylhalobenzimidazoles and their use as herbicides.

Benzimidazoles are heterocyclic compounds based on the structure

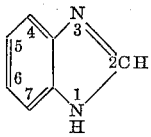

Those benzimidazoles possessing a free imino hydrogen (in the 1-position) are tautomeric systems and the derivatives not possessing a plane of symmetry can exist in two possible tautomeric forms. Thus, the 4- or 5-substituted benzimidazoles can also exist in the 7- or 6-substituted forms, respectively. Therefore, whenever a mono- or polysubstituted benzimidazole not possessing a plane of symmetry is named, it is usually referred to using both positions, as, for example, 5(6)-chlorobenzimidazole or 4(7)-chlorobenzimidazole. This system of nomenclature is followed in the following description and claims.

According to the present invention, there are provided novel benzimidazole compounds of the formula

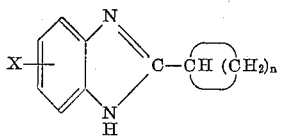

where X is a halogen radical selected from bromine and chlorine, and $n$ is an integer selected from 2 and 3. Thus, the substituent at the 2-position is a cycloalkyl group, such as cyclopropyl, cyclobutyl, and the like. The compounds having the halogen substituent in either the 5- or 6-position, therefore being unsubstituted in the 4- and 7-position, are prepared from more readily available starting materials, but the 4(7)-halogenated compounds are also included within the scope of the invention.

The benzimidazoles of the present invention are normally crystalline solids which are soluble in the usual organic solvents, such as alcohols and hydrocarbons, and insoluble in water. The compounds appear to be more soluble in the polar organic solvents such as the alcohols, than they are in the non-polar solvents. They are excellent herbicides when applied as either a pre-emergence or post-emergence treatment and may be formulated with the usual herbicide carriers for use in controlling unwanted plants.

Compounds of this invention are readily prepared by reaction of substantially equimolar amounts of the appropriate halogen-substituted ortho-phenylenediamine with cyclopropanecarboxylic acid or cyclobutanecarboxylic acid in the presence of a mineral acid, such as hydrochloric acid or polyphosphoric acid. The reaction takes place at elevated temperatures, such as in the range of about 80° to 120° C. in a relatively short period of time. Water is a suitable reaction medium since the desired product is substantially insoluble in water and can be isolated readily by filtration or extraction after neutralization of the mixture. The desired crystalline product is purified by conventional procedures, such as recrystallization.

The following examples are presented to illustrate the preparation of representative compounds of this invention, but it is to be understood that the invention is not limited to the specific examples given.

*Example I.—2-cyclopropyl-5(6)-chlorobenzimidazole*

A solution of 14.3 g. (0.1 mole) of 4-chloro-o-phenylenediamine and 7.9 ml. (8.6 g.; 0.1 mole) of cyclopropane carboxylic acid in 100 ml. of 4 N aqueous hydrochloric acid was heated at reflux for 4 hours. The solution was allowed to cool and was then neutralized with concentrated ammonium hydroxide. The precipitated solids were collected by filtration, washed with water and dried. Recrystallization from ethanol-water gave the desired product as a tan solid, M.P. 200°–203° C. (8.2 g.; 42.6% yield).

*Example II.—2-cyclobutyl-5(6)-chlorobenzimidazole*

A solution of 14.3 g. (0.1 mole) of 4-chloro-o-phenylenediamine and 10 g. (0.1 mole) of cyclobutanecarboxylic acid in 100 ml. of 4 N aqueous hydrochloric acid was heated at reflux for 7 hours. The solution was cooled, diluted with 2 volumes of water and filtered. The filtrate was neutralized by drop-wise addition of 5 N ammonium hydroxide with stirring. The precipitated solids were collected by filtration, washed with water and dried. Recrystallization from ethanol-water gave the desired product as a tan solid, M.P. 182°–185° C. (15.5 g.; 75% yield).

Other compounds embraced by the present invention which can be prepared according to the above-described procedure comprise 2-cyclopropyl-5(6)-bromobenzimidazole, 2-cyclobutyl-5(6)-bromobenzimidazole, 2-cyclopropyl-4(7)-chlorobenzimidazole and 2-cyclobutyl-4(7)-chlorobenzimidazole.

The substituted benzimidazoles of this invention are effective herbicidal compounds useful for controlling weed growth. "Weeds" as used herein is intended to include any plant growth which is undesirable. The compounds are useful as a pre-emergence or a post-emergence treatment; that is, they can be used to kill growing plants or they can be used to kill or prevent the emergence of seedlings of the plants. Thus, the compounds can be used to control the growth of weeds by applying a phytotoxic amount to the locus of the weeds, that is, the foilage of the growing weeds or soil in which the weeds are growing or will grow.

The following examples illustrate the herbicidal activity of representative compounds of this invention.

*Example III*

2-cyclopropyl-5(6)-chlorobenzimidazole was dissolved in methanol and applied as both a pre-emergence treatment and post-emergence treatment to corn, millet, ryegrass, oats, peas, mustard, cumumbers and snap beans. At an application rate of 7.5 pounds per acre, a complete kill of all plants was obtained with both the pre-emergence and post-emergence treatments.

*Example IV*

2-cyclobutyl-5(6)-chlorobenzimidazole was dissolved in methanol and applied to corn, millet, ryegrass, oats, peas, mustard, cucumbers and snap beans as both a pre-emergence and post-emergence treatment. At an application rate of 15 pounds per acre, all plants treated pre-emergence were killed. At the same rate, all plants treated post-emergence, except for corn, were killed. The corn plants were injured but not killed.

An application rate in the range of from about 0.5 to 50 pounds of one or more of the active compounds per acre is generally an effective phytotoxic amount, although greater or lesser amounts can be used. The presently preferred application rate is in the range of about 1 to 20 pounds per acre.

Since a relatively small amount of one or more of the active substituted benzimidazoles should be distributed over the area preferably